United States Patent Office 2,811,212
Patented Oct. 29, 1957

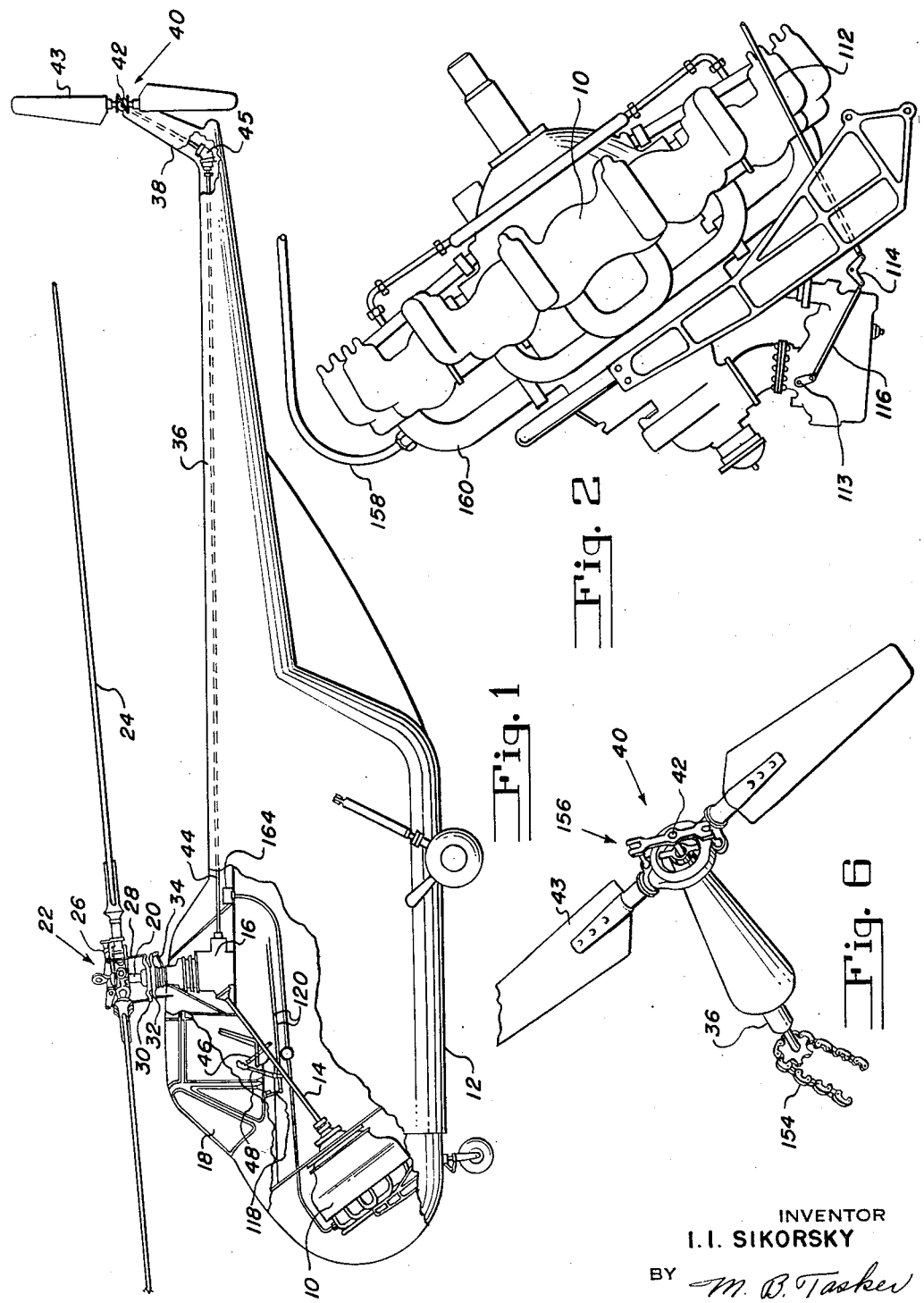

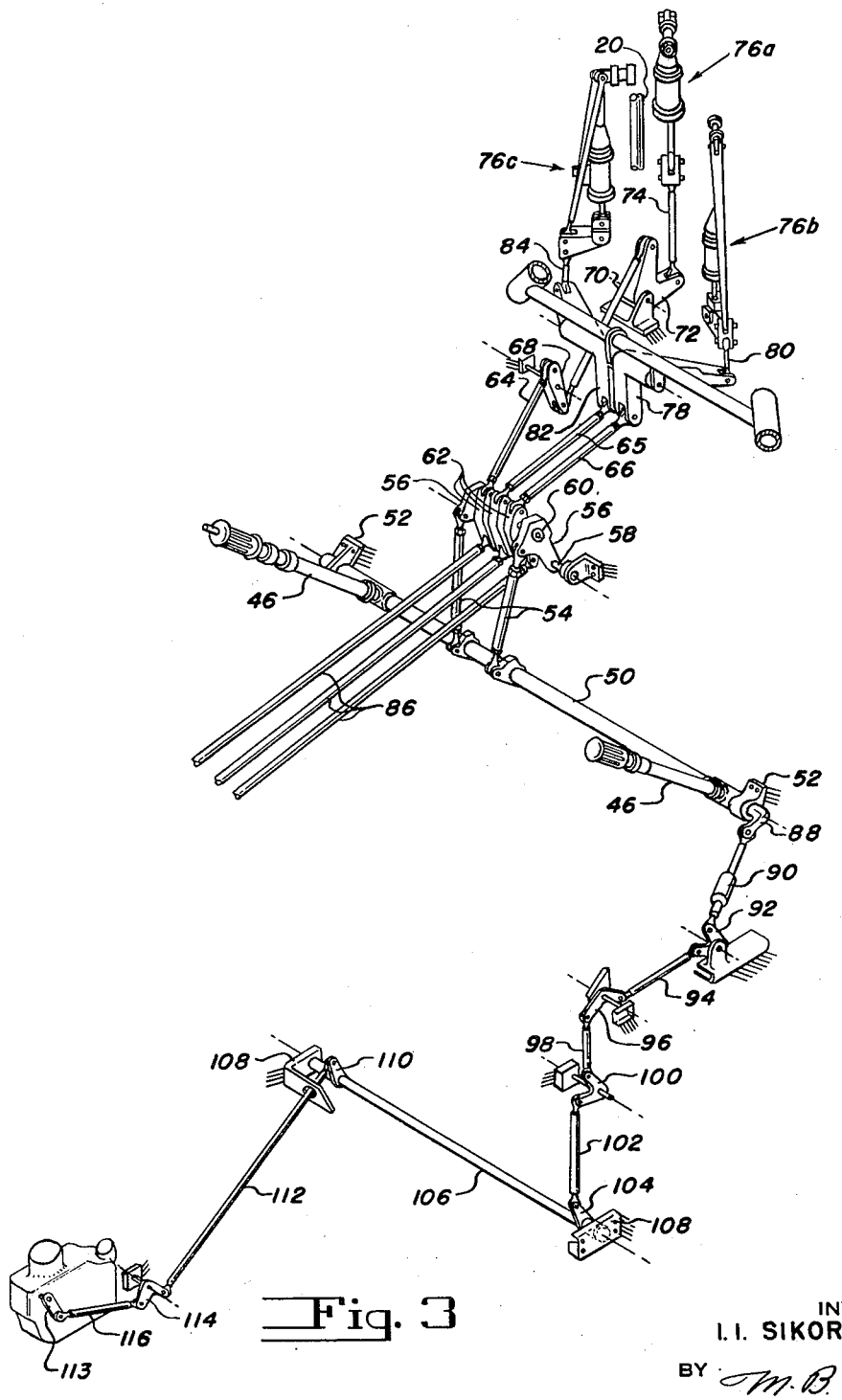

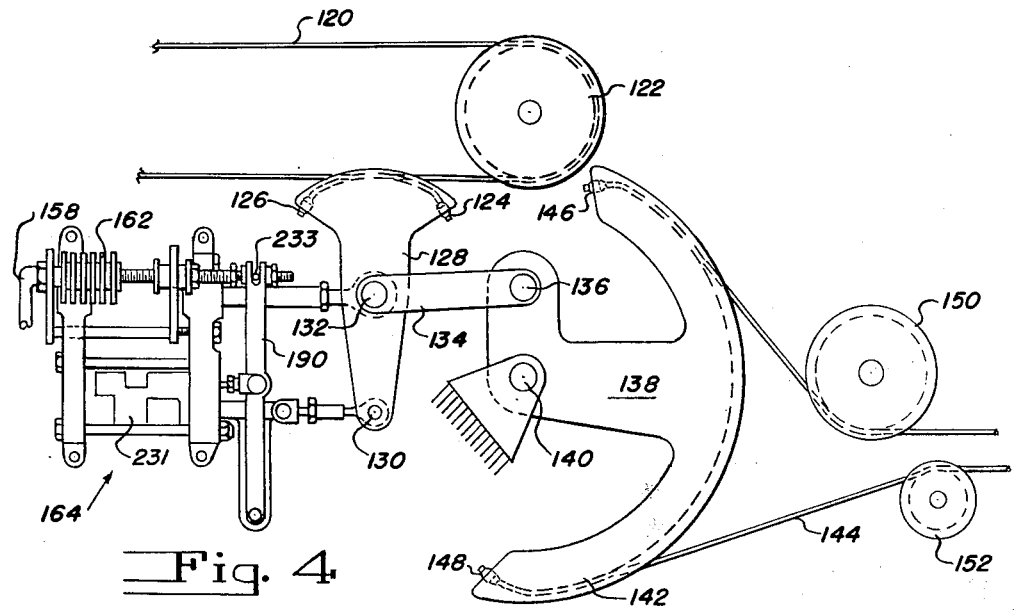
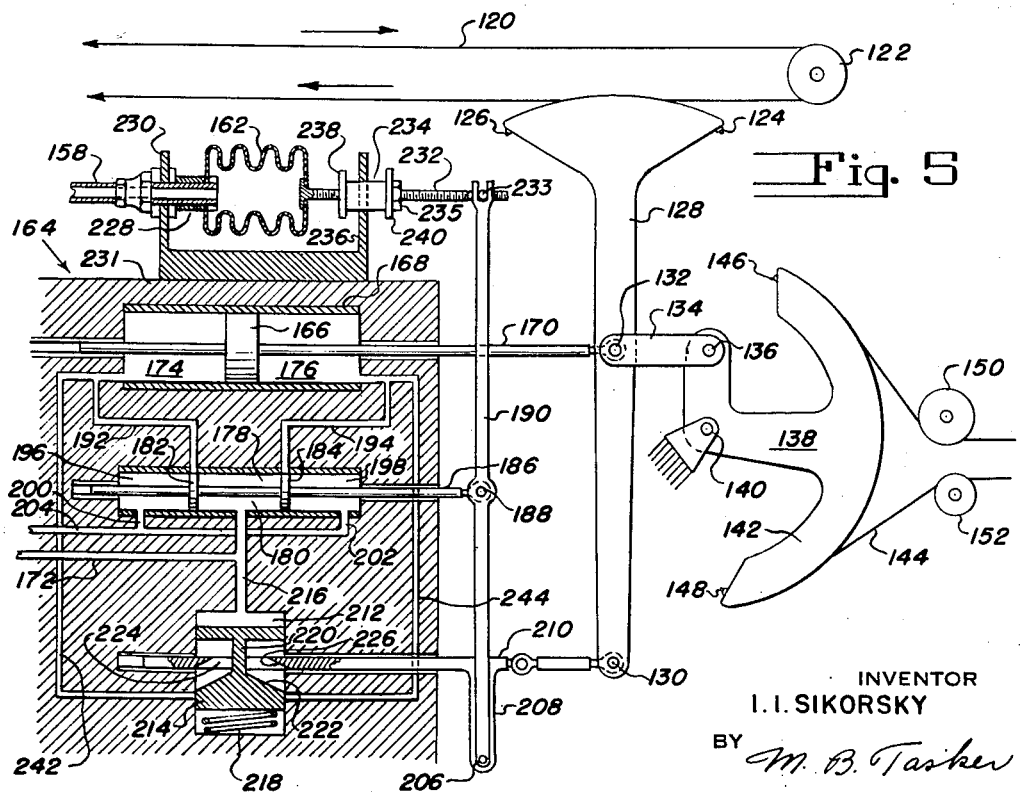

2,811,212

TAIL ROTOR PITCH CONTROL BY ENGINE MANIFOLD PRESSURE

Igor I. Sikorsky, Easton, Conn., assignor to United Aircraft Corporation, East Hartford, Conn., a corporation of Delaware Application November 24, 1953, Serial No. 394,077

9 Claims. (Cl. 170—135.22)

This invention relates to rotary wing aircraft of the type having a single sustaining rotor located at the forward end of the fuselage and rotatable about a generally vertical axis and a tail rotor located at the aft end of the fuselage and rotatable about a generally horizontal axis for counteracting the torque of the main rotor.

It has been the practice in this type of helicopter to provide an operative connection between the collective pitch stick for the main rotor and the carburetor throttle which automatically provides a corresponding adjustment in throttle opening with each change in main rotor pitch, thus preventing the rotor, for example, from slowing down upon increase in collective pitch of the rotor blades to such an extent that the centrifugal forces acting on the blades are reduced to a dangerous value.

At the same time the collective pitch is increased and the throttle is opened, a change in tail rotor pitch is also required to compensate for the increase in torque of the main rotor. This is usually controlled by the rudder pedals which control the heading of the ship by varying the pitch of the tail rotor to vary its torque, it being understood that the speed of the tail rotor relative to the main rotor remains fixed since the two rotors are interconnected. This has the distinct disadvantage that the pilot whenever he changes main rotor collective pitch with his hands must at the same time effect a compensating change of tail rotor pitch with his feet.

It is known to connect the tail rotor pitch control cables mechanically to the combined throttle and pitch levers, as shown for example in my Patent No. 2,318,260. This arrangement however has the disadvantage that when the pilot pulls up on the collective pitch lever in a flair-out during a power-off autorotative landing with a mechanically connected tail rotor pitch linkage a large torque correction is applied by the tail rotor when none is desired. This has frequently resulted in a bad accident when the pilot is making a forced landing frequently in a tight spot and forgets to reduce tail rotor pitch as he pulls up on the collective pitch stick with the result that the ship is swung violently to one side at the moment of ground contact.

Another system for obtaining tail rotor pitch compensation has been proposed in which torque exerted by the gear box is used as a measure of engine power output and controls the tail rotor pitch. Such a system has the disadvantage that it involves the structural problem of mounting an element of the transmission, such as the gear box, which because of the gear reduction used in driving a helicopter rotor developes a much higher torque than the engine. Any pivotal or flexible mounting of such a transmission requires a heavy and complicated mechanical arrangement.

One of the advantages of this invention and hence one of its principal objects is to provide a helicopter of the single sustaining rotor type in which the tail rotor pitch setting is made responsive to engine operation; that is, it is sensitive to whether or not the engine is running as well as to any intermediate power settings which may be used during flight.

A further object of this invention is to provide an improved mechanism for controlling the tail rotor pitch in response to engine power output which is extremely simple and inexpensive and does not carry a heavy weight penalty.

A further object of the invention is to provide such an improved automatic tail rotor pitch control of this type which applies a relatively sensitive control which can at any time be overriden by the usual pilot's pedal control.

A still further object of the invention is to provide a tail rotor pitch control device of the type described which is responsive to engine manifold pressure.

A yet further object of the invention is to provide a tail rotor pitch control device of this improved type which operates through the same servomotor mechanism provided for controlling tail rotor pitch by the rudder pedals.

A further object of the invention is generally to improve the construction and operation of helicopter controls.

These and other objects and advantages of the invention will appear from the following detailed description of one embodiment of the invention shown in the accompanying drawings.

In these drawings:

Fig. 1 is a side elevation of a helicopter embodying the invention;

Fig. 2 is a view of the engine;

Fig. 3 is a perspective view on an enlarged scale showing part of the main rotor pitch control mechanism;

Fig. 4 is a side elevation of the servomotor mechanism for varying tail rotor pitch incorporating the manifold pressure control of this invention;

Fig. 5 is a diagrammatic view of the structure of Fig. 4; and

Fig. 6 shows the details of the tail rotor variable pitch mechanism.

Fig. 1 shows a helicopter embodying the invention in which an engine 10 located in the nose of a fuselage 12 drives an oblique shaft 14 which extends into a gear box 16 located aft of a pilot's compartment 18 located above the engine. Shaft 20 extends from the gear box upwardly and supports the main sustaining rotor generally indicated at 22 which carries a plurality of variable pitch rotor blades 24. Each of these blades has the usual blade horn 26 which is connected by rod 28 to the rotating swash plate element 30 universally mounted on the drive shaft and also free for body vertical movement as is usual in this type of helicopter. The non-rotatable element 32 of the swash plate is fixed against rotation by a scissors 34 and is free to tilt universally and move up and down the shaft 20 with the rotating element 30.

The fuselage is provided with the usual tail cone 36 terminating in a pylon 38 which supports a tail rotor generally indicated at 40 for rotation about a horizontal shaft 42. As herein shown, the tail rotor is provided with two blades 43 and is driven from the gear box 16 through a shaft 44 and an angle gear box 45 so that the tail rotor speed is always proportional to the speed of rotation of the main rotor.

The usual dual pilot control members are provided including collective pitch control levers 46 and cyclic pitch control sticks 48, one of which is shown in Fig. 1. As shown in Fig. 3, rotation of either of the collective pitch levers 46 rotates the shaft 50 journalled in fixed bearings 52 causing the links 54 to rotate the two bellcranks 56 about the axis of shaft 58 which displaces the shaft 60 on which the three cyclic pitch control bellcranks 62 are pivoted. This movement of the levers 46 displaces all of the bellcranks 62 equally and simultaneously to move rods 64, 65 and 66. Rod 64 is connected to one arm of a bellcrank 68, the other arm of which is connected to a rod 70 which in turn is connected to one arm of a bellcrank 72. The other arm of bellcrank 72 is connected to a rod 74 which is connected through hydraulic servo mechanism 76a to one side of the non-rotating swash plate element 32. Rod 66 is connected to one arm of a bellcrank 78, the other arm of which is connected to a rod 80 which is likewise connected to hydraulic servo mechanism 76b connected to the opposite lateral side of the non-rotating swash plate element 32. Rod 65 is likewise connected to one arm of a bellcrank 82, the other arm of which is connected to a rod 84 connected to hydraulic servo mechanism 76c which is connected to the forward part of the non-rotating swash plate element 32 to provide fore and aft control of the latter. Movement of the three cyclic pitch bellcranks 62 is controlled by three rods 86 which are connected to suitable cyclic pitch control mechanism not shown. The control of the main rotor blade pitch both cyclically and collectively as well as the hydraulic servomotor mechanism 76a, 76b and 76c are shown and described more fully in a copending application of Walter Gerstenberger, Serial No. 186,744, filed September 26, 1950, now U. S. Patent No. 2,755,870 and assigned to the assignee of the present application. Reference is made to this copending application for further understanding of the detailed construction and operation of the main rotor pitch control as this in itself forms no part of the present invention.

As shown in Fig. 3, the collective pitch control levers 46 also control the throttle of engine 10. To this end the shaft 50 carries radial extending arm 88, one end of which is pivotally connected to one end of a link 90, the other end of which is connected to one arm of the bellcrank 92. The other arm of bellcrank 92 is connected to a link 94 which is pivotally connected to one arm of a bellcrank 96, the other arm of which is connected to a link 98. Link 98 in turn is connected to one arm of a bellcrank 100, the other arm of which is connected to a link 102 which is pivotally connected to an arm 104 on a shaft 106, rotatable in fixed bearings 108. Shaft 106 carries a second arm 110, the extended end of which is pivotally connected to a rod 112 which is connected to the engine throttle 113 through a bellcrank 114 and the link 116. It will thus be evident that as the collective pitch control levers 46 are moved clockwise, as viewed in Fig. 3, to simultaneously increase the pitch of all the blades of the main rotor 22, the throttle 113 of the engine is correspondingly moved in a throttle opening direction to increase the engine power output so that the increased pitch of the blades will not reduce the speed of the rotor.

Pilot operative means are also provided for controlling the pitch of the tail rotor blades 43. To this end the usual rudder pedals 118 are provided (Fig. 1) which are connected to a cable 120 which extends from the usual left and right rudder pedals around cable reel 122 (Fig. 4). The ends of cable 120 are connected at 124 and 126 to a lever 128 pivoted at 130 to a lost motion device commonly known in this art as a "sloppy link" connection hereinafter more fully described in connection with hydraulic servo mechanism for assisting the pilot in controlling tail rotor pitch. Lever 128 is pivotally connected intermediate its ends at 132 with a link 134, the other end of which is pivotally connected at 136 to a bellcrank 138 pivoted at 140 to fixed structure of the aircraft. Bellcrank 138 at its free end carries an arcuate cable receiving grooved portion 142 to the opposite ends of which the ends of a cable 144 are secured at 146 and 148. Cable 144 runs over cable sheaths 150 and 152 and controls the tail rotor pitch control chain 154 which is connected to the blade pitch changing mechanism 156 of the tail rotor in the usual manner, as is shown, for example, in U. S. Patent No. 2,499,314.

In accordance with this invention means are also provided for automatically controlling the pitch of the tail rotor blades 42 which is responsive to whether or not the engine is running as well as to various intermediate power settings of the engine throttle during flight. To this end a fluid connection 158 is provided which extends from the engine intake manifold 160 of engine 10 to a Sylphon bellows 162 associated with the hydraulic mechanism generally indicated at 164 for the control of the tail rotor pitch setting which will now be described in detail, reference being had to Figs. 4 and 5. A hydraulic servo piston 166 movable in a cylinder 168 has a piston rod 170 pivotally connected to lever 128 at point 132. Hydraulic fluid under pressure entering by the conduit 172 is supplied to chambers 174 or 176 on opposite sides of piston 166 under the control of a pilot valve 178. Thus fluid entering under pressure through conduit 172 enters chamber 180 between two lands 182 and 184 of the pilot valve. The valve rod 186 is connected at 188 to a control lever 190 which controls the movement of the pilot valve 178. Lands 182 and 184 normally cover conduits 192 and 194 which communicate with chambers 174 and 176, respectively, of the power servo. Chambers 196 and 198 of the pilot valve are vented through connections 200 and 202 to the low pressure line 204 of the hydraulic system in a well-known manner.

Control lever 190 is pivoted at its lower ends at 206 to a depending arm 208 rigidly mounted on the sloppy link 210. One end of link 210 is pivoted at 130 to the lower end of lever 128 and the other end extends laterally through a cylinder 212 in which a piston 214 is movable. Chamber 212 is connected by a conduit 216 to the high pressure conduit 172 so that the fluid under pressure in this conduit acts on the top of piston 214 and urges the latter downwardly in the chamber against a compression spring 218 which constantly biases the piston upwardly. Piston 214 has an intermediate portion 220 of reduced diameter which is connected by a conical portion 222 to the lower end of the piston. The reduced portion 220 of piston 214 is received in an aperture 224 in link 210, this aperture being somewhat larger than the diameter of the reduced portion 220, thus permitting a limited freedom of longitudinal movement of the link 210. However, the aperture 224 has flared side walls 226 which conform to the conical shape of portion 222 on the piston so that upon failure of hydraulic pressure in the line 172, piston 214 is forced upwardly by spring 218 to bring its conical portion into aperture 224 and lock the link 210 rigidly against longitudinal movement.

The bellows 162 has at one end a pedestal 228 which is fixed in one arm 230 of a U-shaped bracket formed integral with and on the side of the casing 231 which houses the servo motor piston, the pilot valve and the sloppy link mechanism just described. The conduit 158 previously described which communicates with the intake manifold 160 of the engine extends through arm 230 and through the pedestal 228 to the interior of the bellows. The other and free end of bellows 162 has a rod 232 secured thereto which has threaded thereon a suitable bushing 234 which is guided in the other arm 236 of the U-shaped bracket. Rod 232 is threaded at its free end and has its threaded end pivotally connected to the upper end of lever 190 previously referred to by a pin 233 (Fig. 4) mounted in an adjustable nut on rod 232. The upper end of lever 190 is provided with a vertical slot in which pin 233 can move as lever 190 swings about its pivot 206. The bellows 162 is shown in Fig. 5 in an intermediate position. It will be understood that as the engine throttle is closed the bellows will contract whereas opening of the engine throttle will result in increased pressure within the bellows which will cause it to expand. If the engine is not supercharged the bellows 162 will operate between 0 and 30 inches of mercury, whereas in a supercharged engine its pressure range may be 0 to 60 inches of mercury.

In order to limit the movement of the upper end of lever 190 and hence to place limits on the expansion and contraction of the bellows, opposing stops 238 and 240 are provided. Stop 238 is integral with and of larger diameter than the bushing 234 which is threaded on shaft 232. Stop 240 is held in place against the opposite end of bushing 234 by nut 235 which also is threaded on shaft 232, locking the unit rigidly to the shaft. The stops 238 and 240 contact the bracket arm 236 to limit the travel of the bellows as it expands and contracts.

In operation, whenever the pilot moves his pedals for directional control of the helicopter, the cable 120 will cause lever 128 to move about its intermediate pivot 132 which will be a fixed pivot temporarily due to the fact that the pilot valve 178 is centered and piston 166 is held fixed by the fluid trapped in chambers 174 and 176 and acting on opposite ends of the piston. Accordingly, movement of lever 128 by the pilot's pedals will result in movement of the pivot point 130. Assuming that the pilot moves his pedals in a pitch increasing direction, the cable 120 will move in the direction of the arrows indicated in Fig. 5, causing the lever 128 to move counterclockwise about its intermediate pivot 132. Pivot point 130 and the sloppy link 210 will accordingly move to the right as viewed in Fig. 5. Since no change in the throttle setting is being made, the pivot pin 233 will remain fixed and lever 190 will accordingly move in a counterclockwise direction about point 233 to move the pilot valve 178 to the right, admitting fluid from chamber 180 through conduit 194 to chamber 176. Accordingly the power piston 166 will move pivot points 132 and 136 to the left causing bellcrank 138 to move counterclockwise about pivot 140 to increase the tail rotor pitch. This movement of lever 128 to the left by the power piston 166 results in a clockwise follow-up movement of lever 128 about its upper end, held by cable 120, which causes movement of the pilot valve 178 to its original centered position shown in Fig. 5 in which the power piston 166 is hydraulically locked. This follow-up movement also centers the sloppy link 210 with the reduced stem portion 220 of piston 214 centered in aperture 224 of the sloppy link 210, thus permitting a limited movement of this member in either direction to allow for subsequent change in tail rotor pitch in either direction. The above described servo operation of the tail rotor pitch by the pilot can occur at any time that directional control is required.

Whenever the pilot increases or decreases the collective pitch of the main rotor blades a compensating control of tail rotor pitch will automatically take place. Thus if the pilot increases the collective pitch of the main rotor blades, the throttle will automatically open a corresponding amount due to the combined collective pitch and throttle connection shown in Fig. 3. Opening the throttle will increase the pressure in the intake manifold 160 and, due to the connection of the intake manifold by conduit 158 to the bellows 162, the latter will expand a proportional amount resulting in movement of the pivot pin 233 to the right, as viewed in Fig. 5. Lever 190 will move clockwise about its lower pivoted end 206, since lever 128 and the sloppy link 210 are held fixed. This will be clear when it is considered that pivot point 132 is fixed by the locked power piston 166 and the upper end of lever 128 is held fixed by cable 120. This movement of lever 190 in a clockwise direction about pivot 206 will cause pilot valve 178 to move to the right. As pilot valve 178 moves to the right it admits pressure fluid from chamber 180 to chamber 176 of the power cylinder, resulting in counterclockwise movement of lever 138 about its pivot 140 to increase the pitch of the tail rotor blades. As power piston 166 moves point 132 to the left in Fig. 5 about the upper end of lever 128, which is held by cable 120, the lower end of lever 128 moves the lever 190 in a lockwise direction about pin 233, which is now a fixed point, to bring the pilot valve back into its centered position. The operation of the collective pitch stick in a pitch decreasing direction produces a similar but opposite operation of the mechanism above described.

In the event that a failure of the hydraulic pressure occurs, spring 218 moves piston 214 upwardly (Fig. 5), the conical surfaces 222 of the piston engaging the flared side walls 226 of the sloppy link 210 to hold the latter against longitudinal movement. At the same time the lower end of piston 214 uncovers conduits 242 and 244 which communicate with chambers 174 and 176 of the servomotor thus permitting free movement of power piston 166 and rod 170 in either direction. It will be noted that movement of lever 128 by the pilot's pedals now takes place about fixed point 130 without any lost motion in the link 210.

In the event that engine failure takes place the bellows 162 will slowly expand due to its inherent resilience and the gradual increase in pressure in the manifold as the engine slows down and stops, causing the tail rotor pitch to be automatically increased. However, the pilot, at the time when he is making the transition to autorotation will have plenty of time to take over the directional control of the helicopter by operation of his pedals. It is to be noted that when the pilot approaches the ground for an autorotative landing and pulls back on the collective pitch stick for a flare-out, he is relieved of the necessity of operating his pedals to compensate for an increase in tail rotor pitch at this critical moment. It will be understood that during such a flare-out in autorotation the increase in collective pitch of the main rotor blades does not result in a tendency for the fuselage to rotate about the main rotor drive shaft since there is no torque developed other than that due to friction in the main rotor bearings.

It will be evident that as a result of this invention means has been provided for automatically varying the tail rotor pitch in response to variations in pitch of the main rotor during power-on flight. It will also be evident that this improved automatic control of tail rotor pitch has decided advantages over the direct linkage connection between main rotor and tail rotor pitch control mechanism since it gives the pilot plenty of time to adjust the tail rotor pitch for an autorotative landing with his pedals while he is at a safe altitude and relieves him of any further adjustment at the critical moment of making his landing.

It will also be understood that this improved control of tail rotor pitch does not in any way interfere with the operation of the pilot's pedals under any condition of operation so that the pilot is always free to operate his pedals for directional control or for trim purposes.

It will also be clear that in providing the improved tail rotor pitch compensation of the invention the existing servomotor mechanism has been utilized, greatly simplifying and reducing the cost of the control system.

One of the advantages which the tandem rotor helicopter configuration had, prior to this invention, over the single sustaining rotor machine, was the ability of the tandem helicopter to respond to total pitch changes without change of heading on the tandem helicopter with the center of gravity equally spaced between the two rotors. Increase of collective pitch was the same on both rotors and the ship could be maneuvered close to rough waters, such as in anti-submarine operations, always maintaining heading which was vital for the directional location of underwater echoes. The tail rotor pitch compensating device of this invention operates equally well without any increase in weight of the helicopter and has demonstrated that the single rotor helicopter can compete, even in this respect, with the tandem helicopter. Of course, other advantages of the single rotor machine are well known.

While only one embodiment of the invention has been shown herein, it will be understood that various changes in the construction and arrangement of the parts may be resorted to without departing from the scope of the invention.

I claim:
1. In a helicopter, a main sustaining rotor having variable pitch blades, an anti-torque tail rotor having variable pitch blades, an engine for driving said rotors at a predetermined speed ratio having a throttle, a first member for varying the pitch of said main rotor blades and the setting of said throttle, a second member for varying the pitch of said tail rotor blades, and means operatively connected to said second member and to said engine responsive to an engine operating parameter for adjusting said second member to vary the pitch of said tail rotor blades and compensate for pitch changes of said main rotor blades whenever said first member is operated.

2. In a helicopter, a main sustaining rotor having variable pitch blades, an anti-torque tail rotor having variable pitch blades, an engine for driving said rotors at a predetermined speed ratio having a throttle, a first member for varying the pitch of said main rotor blades having an operative connection to the throttle of said engine, a second member for varying the pitch of said tail rotor blades, and means operatively connected to said second member and to said engine responsive to engine intake manifold pressure for adjusting said second member to vary the pitch of said tail rotor blades whenever said first member is operated.

3. In a helicopter, a main sustaining rotor having variable pitch blades, an anti-torque tail rotor having variable pitch blades, an engine for driving said rotors at a predetermined speed ratio, a first member for varying the pitch of said main rotor blades having an operative connection to the throttle of said engine, a second member for varying the pitch of said tail rotor blades, and means operatively connected to said second member and to said engine responsive to engine intake manifold pressure for adjusting said second member to correspondingly vary the pitch of said tail rotor blades automatically in power-on flight in response to increases and decreases in pitch of said main rotor blades.

4. In a helicopter, a main sustaining rotor having variable pitch blades, an auxiliary rotor having variable pitch blades, pilot operable members for independently controlling the pitch of said blades, an engine including a throttle and an intake manifold, driving connections between said engine and both of said rotors for driving said rotors at a predetermined speed ratio, and means for governing the pitch of said auxiliary rotor including an intake manifold pressure responsive member operably connected to said manifold and to said tail rotor pitch controlling member.

5. In a helicopter including a main sustaining rotor having variable pitch blades, an anti-torque rotor having variable pitch blades, an engine for driving said rotors having a throttle and an intake manifold, transmission means connecting said engine to said rotors for driving them at a fixed speed ratio, pilot operative means for controlling the pitch of said main rotor blades, means interconnecting said pilot operative means with said throttle for effecting changes in said throttle position with changes in blade pitch of said main rotor, and means responsive to engine manifold pressure and operative only during power-on flight for varying the pitch of said tail rotor blades to compensate for variations in the pitch of said main rotor blades.

6. In a helicopter including a main sustaining rotor having variable pitch blades, an anti-torque rotor having variable pitch blades, an engine for driving said rotors having a throttle and an intake manifold, transmission means connecting said engine to said rotors for driving them at a fixed speed ratio, pilot operative means for controlling the pitch of said main rotor blades, means interconnecting said pilot operative means with said throttle for effecting changes in said throttle position with changes in blade pitch of said main rotor, and means responsive to engine manifold pressure and operative only during power-on flight for varying the pitch of said tail rotor blades to compensate for variations in the pitch of said main rotor blades, and pilot operative means for varying said tail rotor pitch independently of said main rotor pitch during power-off flight.

7. In a helicopter including a main sustaining rotor having variable pitch blades, an anti-torque rotor having variable pitch blades, an engine for driving said rotors having a throttle and an intake manifold, transmission means connecting said engine to said rotors for driving them at a fixed speed ratio, pilot operative means for varying the pitch of said main rotor having an operative connection with said throttle, means for automatically varying the tail rotor pitch during power-on flight to compensate for changes in main rotor pitch including means connected to said intake manifold and responsive to variations in manifold pressure, and pilot operative means for varying tail rotor pitch during power-off flight independently of variations in main rotor pitch.

8. In a helicopter including a main sustaining rotor having variable pitch blades, a tail rotor having variable pitch blades, an engine for driving said rotors at a predetermined speed ration including a throttle, means for varying the pitch of said main rotor blades collectively including a pilot operative member, means for connecting said throttle to said pilot operative member for increasing and decreasing the power output of said engine with increase and decrease respectively in pitch of said main rotor blades, and means automatically responsive to engine intake manifold pressure for varying the pitch of said tail rotor blades to compensate for variations in pitch of said main rotor blades during power-on flight, said automatic means being inoperative during autorotation, and pilot operative means for controlling tail rotor pitch independently of said collective pitch varying means and said automatic means during autorotation.

9. In a helicopter, a main sustaining rotor having variable pitch blades, an anti-torque tail rotor having variable pitch blades, an engine for driving said rotors at a predetermined speed ratio having an intake manifold, throttle means for controlling the power output of said engine, a pilot operative member for controlling the pitch of said main rotor blades in unison having an operative connection with said throttle whereby increase and decrease of said main rotor pitch is automatically accompanied by increase and decrease respectively in engine power output, means for varying the pitch of said tail rotor including servomotor mechanism having a pilot valve, and means for actuating said mechanism during power-on flight including a manifold pressure responsive device having an operative connection to said engine manifold, and pilot operative means having an operative connection to said tail rotor pitch varying means for controlling the latter independently of said main rotor pitch during power-off flight.

References Cited in the file of this patent

UNITED STATES PATENTS

| 2,057,877 | Bragunier | Oct. 20, 1936 |
| 2,318,260 | Sikorsky | May 4, 1943 |
| 2,350,126 | Pitcairn | May 30, 1944 |
| 2,644,534 | Jensen | July 7, 1953 |